Figure 1:
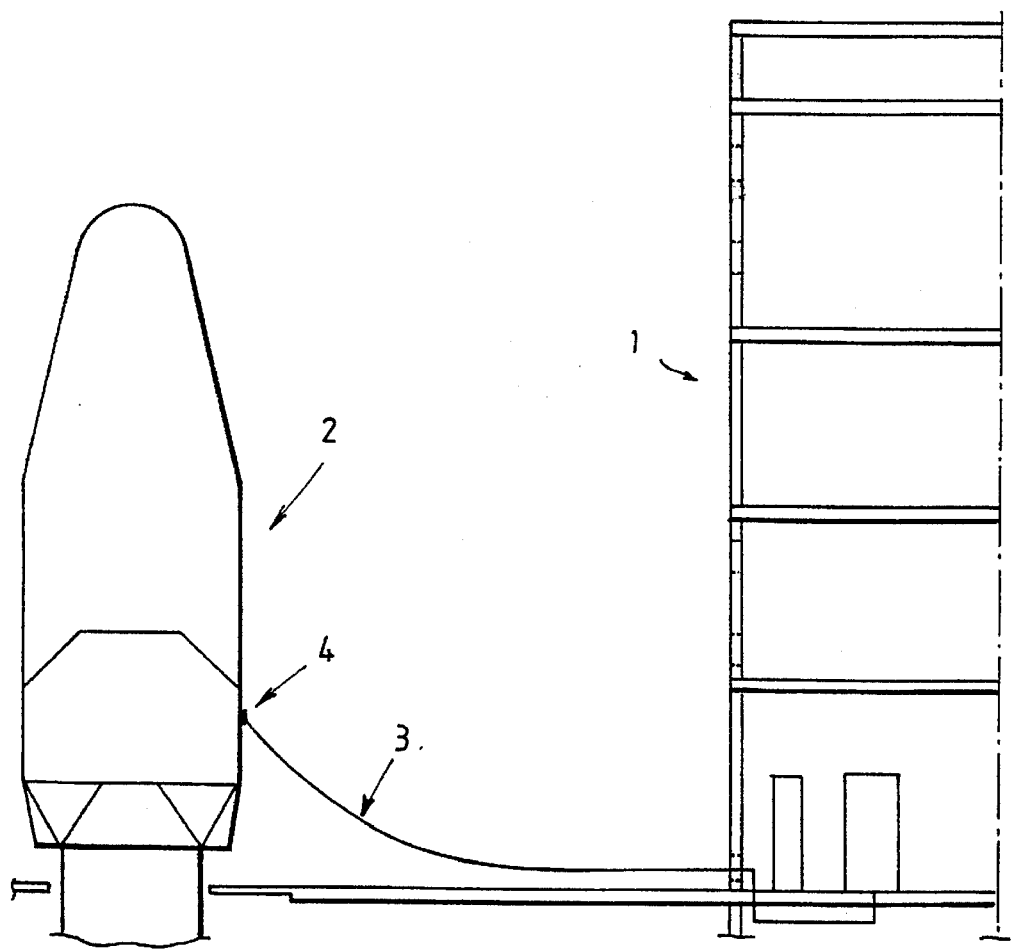

United States Patent [19]
Girard

[11] Patent Number: 5,652,404
[45] Date of Patent: Jul. 29, 1997

[54] DEVICE FOR DISCONNECTING A RELEASABLE CONNECTOR

[75] Inventor: Michel Girard, Evry, France

[73] Assignee: Arianespace, Evry, France

[21] Appl. No.: 588,119

[22] Filed: Jan. 18, 1996

[51] Int. Cl.$^6$ .................................. F41F 3/04; H01R 3/00
[52] U.S. Cl. ...................................... 89/1.811; 439/163
[58] Field of Search ........................... 89/1.811; 439/163, 439/475

[56] References Cited

U.S. PATENT DOCUMENTS

| 2,775,745 | 12/1956 | Eaton | 89/1.811 |
|---|---|---|---|
| 2,786,393 | 3/1957 | Grimes | 89/1.811 |
| 3,339,893 | 9/1967 | Schuette . | |
| 3,444,779 | 5/1969 | Buelle et al. . | |
| 3,518,613 | 6/1970 | Alpert | 89/1.811 |
| 3,593,613 | 7/1971 | Davis . | |
| 3,780,617 | 12/1973 | Tabarie et al. | 89/1.811 |
| 4,092,898 | 6/1978 | Witherspoon | 89/1.811 |
| 4,099,038 | 7/1978 | Purdy | 89/1.811 |
| 4,116,664 | 9/1978 | Herrmann, Jr. | 339/91 R |

*Primary Examiner*—Michael J. Carone
*Assistant Examiner*—Theresa M. Wesson
*Attorney, Agent, or Firm*—Young & Thompson

[57] ABSTRACT

The device for disconnecting a releasable connector for connecting a flexible connecting element (3) of an umbilical tower to a launcher (2) of the type comprising a base (5) fixed on the launcher (2) and adapted to receive a plug (6) connected to the flexible connecting element (3) and comprising pullaway means (7) for releasing the plug upon firing the launcher connected to an end of a pulling element (8), is characterized in that it comprises an element (10) capable of breaking upon firing the launcher for fastening the flexible connecting element (3) to the launcher.

3 Claims, 1 Drawing Sheet

DEVICE FOR DISCONNECTING A RELEASABLE CONNECTOR

The present invention relates to a device for disconnecting a releasable connector.

More particularly, the invention relates to a device for disconnecting a releasable connector connecting a flexible connecting element of an umbilical tower to a launcher.

Various disconnecting devices of this type are known in the art.

Generally, the releasable connector comprises a base fixed on the launcher and adapted to receive a plug connected to the flexible element connecting the tower to the launcher and comprising pullaway means for releasing the plug upon the firing of the launcher connected to an end of a pulling element.

The other end of the pulling element is for example connected to the umbilical tower.

It will therefore be understood that upon the firing of the launcher, the pulling element connected to the umbilical tower causes the release of the connector by an unlocking and a disconnection of the plug from the corresponding base.

However, these devices have a number of drawbacks, in particular an untimely disconnection of the connectors.

An object of the invention is to overcome these problems by providing a disconnecting device which is simple and reliable.

The invention therefore provides a device for disconnecting a releasable connector connecting a flexible connecting element of an umbilical tower to a launcher, of the type comprising a base fixed on the launcher and adapted to receive a plug connected to the flexible connecting element and comprising pullaway means for releasing the plug upon firing the launcher and connected to an end of a pulling element, characterized in that it comprises an element capable of breaking upon firing the launcher for fastening the flexible connecting element to the launcher.

Advantageously, the element capable of breaking is formed by a breakable line having one end fixed to the launcher and the other end fixed to the flexible connecting element by means of a fixing device.

Figure 2:
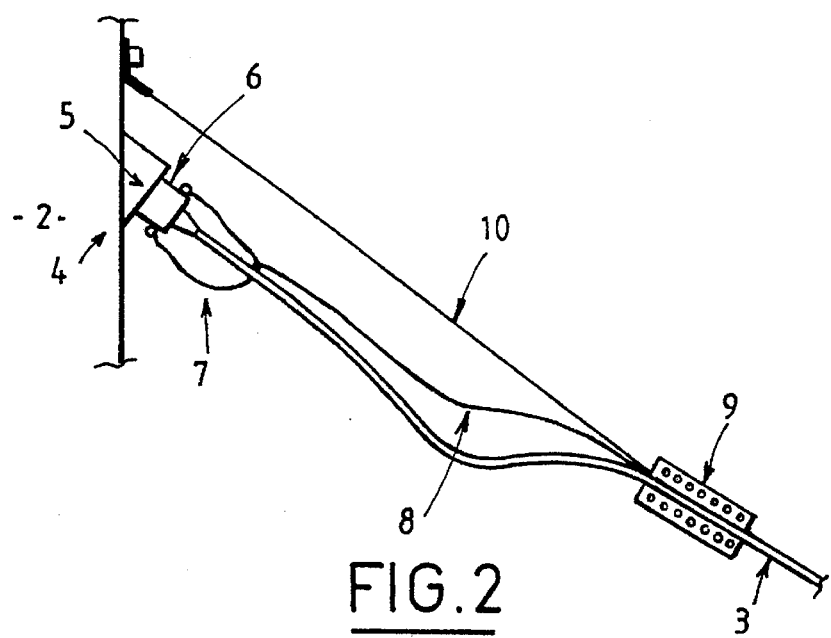

The invention will be better understood from the following description which is given solely by way of example with reference to the accompanying drawings, in which:

FIG. 1 is a diagrammatic view illustrating the use of a releasable connector connecting a flexible element connecting an umbilical tower to a launcher, and FIG. 2 is a diagrammatic view illustrating the structure of a disconnecting device according to the invention.

Shown in FIG. 1 is an umbilical tower 1 of a launcher firing pad of a launcher 2.

Before firing, the umbilical tower and the launcher are interconnected by one or more flexible connecting elements, one of which is designated for example by the general reference numeral 3 in FIG. 1.

These flexible connecting elements may be for example radio-frequency, electric or other connecting elements.

The launcher is provided with a connector 4 of conventional type which is releasable upon firing the launcher.

These connectors generally comprise a base fixed on the launcher and adapted to receive a plug connected to the flexible connecting element 3 and comprising pullaway means which release the plug upon firing the launcher and are connected to an end of a pulling element.

These various elements are shown in FIG. 2 in which are to be found the launcher 2, the flexible connecting element 3 and the releasable connector 4.

The connector comprises a base 5 fixed on the launcher 2 and adapted to receive a plug 6 connected to the flexible connecting element 4.

This plug comprises pullaway means comprising for example a loop of a metal wire 7 connected to an end of a pulling element formed, in the presently described embodiment, by a breakable pulling lanyard 8, the other end of which is fixed for example to the flexible connecting element 3 by a fixing device 9.

Further, the disconnecting device according to the invention further comprises an element which is capable breaking upon firing the launcher for fastening the flexible connecting element 3 to the launcher 2.

This breakable element is designated by the general reference numeral 10 in FIG. 2 and comprises for example a metallic and breakable line having one end fixed to the launcher 2 and the other end fixed to the flexible connecting element 3 by the fixing device 9.

It will therefore be understood that, before firing, the breakable element 10 fastening the flexible connecting element 3 to the launcher 2 permits preventing any untimely disconnection of the releasable connector.

Upon firing, the fastening element 10 breaks, which permits the disconnection in complete safety of the releasable connector by means of the pulling lanyard 8, upon the displacement of the launcher relative to the tower.

What is claimed is:

1. Device for disconnecting a releasable connector for connecting a flexible connecting element of an umbilical tower to a launcher, said device comprising in combination: a base fixed on said launcher, a plug connected to said flexible connecting element and received in said base and comprising pullaway means for releasing said plug upon firing said launcher, and a pulling element having an end connected to said pullaway means, said disconnecting device further comprising an element which is breakable upon firing said launcher and fastens said flexible connecting element to said launcher.

2. Device according to claim 1, wherein said breakable element is formed by a breakable line having one end fixed to said launcher and a second end, and a fixing device fixes said flexible connecting element to said second end of said line.

3. Device according to claim 2, wherein said pulling element is formed by a pulling lanyard having an end remote from said pullaway means fixed to said flexible connecting element by said fixing device.

* * * * *